United States Patent [19]
Shigeno et al.

[11] Patent Number: 5,157,245
[45] Date of Patent: Oct. 20, 1992

[54] MAGNETIC SENSOR

[75] Inventors: Yoshiharu Shigeno, Kanagawa; Michihiro Murata, Kyoto; Yu Nishino, Kanagawa, all of Japan

[73] Assignee: Murata Mfg. Co., Ltd., Kyoto, Japan

[21] Appl. No.: 373,170

[22] Filed: Jun. 28, 1989

[30] Foreign Application Priority Data

Jun. 29, 1988 [JP] Japan .................. 63-85993[U]
Jun. 29, 1988 [JP] Japan .................. 63-85994[U]
Jun. 29, 1988 [JP] Japan .................. 63-85995[U]

[51] Int. Cl.⁵ .................................................. G06K 7/08
[52] U.S. Cl. ........................................ 235/449; 360/113
[58] Field of Search ................ 235/449, 453, 444; 360/121, 110, 109, 113; 361/392, 394

[56] References Cited
U.S. PATENT DOCUMENTS

| | | | |
|---|---|---|---|
| 3,327,313 | 6/1967 | Oliver | 360/121 |
| 3,373,416 | 3/1968 | Geurst et al. | 360/121 |
| 3,796,859 | 3/1974 | Thompson | 360/113 |
| 4,167,664 | 9/1979 | Pass | 235/449 |
| 4,696,526 | 9/1987 | Newton et al. | 439/892 |
| 4,812,632 | 3/1989 | Kakinuma et al. | 235/449 |
| 4,879,607 | 11/1989 | Redemacher | 235/449 |
| 4,988,850 | 1/1991 | Masuda et al. | 360/113 |
| 5,038,250 | 8/1991 | Uenaka et al. | 361/392 |

Primary Examiner—John W. Shepperd
Attorney, Agent, or Firm—Koda and Androlia

[57] ABSTRACT

A magnetic sensor for arranging at least one detection unit having a magnetoelectric transducer element for converting magnetic data printed on a bank note, a bond or the like into electric signals and inserted into a unit receiving slot in alignment on a detection line by a screw member provided on a sensor case. A nonmagnetic head cover for covering the unit receiving slot of the magnetic sensor is fixed to the magnetic sensor by engaging claw portions provided on the head cover with claw portion receiving grooves on the side surfaces of the sensor case with resilience or inserting leg portions provided on the head cover into cover receiving grooves provided on sensor case with the unit receiving slot therebetween.

13 Claims, 13 Drawing Sheets

MAGNETIC SENSOR

BACKGROUND OF THE INVENTION

1. Field of the Invention

The present invention relates to a magnetic sensor using a magnetically biased magnetoelectric transducer element and used for, for example, a bank note identifying apparatus for identifying the denomination of a bank note.

2. Description of the Prior Art

A conventional magnetic sensor for identifying the letters and marks printed in magnetic ink or the like on an object being detected such as a bank note and a bond has a structure shown in FIGS. 17 to 23.

In these drawings, the reference numeral 1 represents a comparatively long sensor case made of a nonmagnetic material such as an aluminum diecast. The sensor case 1 is provided with a plurality of (e.g., 3) vertical through slots as unit receiving slots 1A, and inclined surfaces 1B formed on both sides in the widthwise direction of the upper surface thereof at which a note bank guide plate (not shown) is located.

A detection unit 2 inserted into each of the unit receiving slots 1A is made of a nonmagnetic material such as a plastic material and is mainly composed of a rectangular stem 3 inserted into the unit receiving slot 1A; a permanent magnet 4 with a part thereof buried in the upper portion of the stem 3 and the upper surface and the undersurface thereof magnetized as an S-pole and an N-pole, respectively; a magnetoresistance element 5 as a magnetoelectric transducer element which is magnetically biased by the permanent magnet 4; and terminal pins 6 for connecting the magnetoresistance element 5 to the output terminal, as shown in FIG. 19. The magnetoresistance element 5 is located in the vicinity of the upper opening of the unit receiving slot 1A on the side of the surface over which a bank note passes and outputs a detection signal converted into a voltage in accordance with the presence or absence of magnetic ink on a bank note when the bank note passes over a head cover 8 which will be described later.

The reference numeral 7 denotes a side spacer made of a nonmagnetic material such as plastic and ceramic materials and provided on the stem 3 on both sides in the widthwise direction of the magnetoresistance element 5. The height of the side spacer 7 is so determined as to be slightly higher than the upper surface of the magnetoresistance element 7, thereby preventing the head cover 8 from warping, which may result in the damage of the magnetoresistance element 5 or generation of piezo noise.

The head cover 8 is attached to the upper surface side of the sensor case 1 so as to cover the side spacers 7. The head cover 8 is made of a nonmagnetic metal material such as tungsten, phosphor bronze, titanium and an alloy thereof.

The head cover 8 is composed of a flat portion 8A which has a flat surface so as to guide a bank note and adhesive surfaces 8B formed by bending the right and left side portions of the flat portion 8A into two bend portions, respectively. Each of the adhesive surfaces 8B is bonded with the corresponding inclined surface 1B and side surface of the sensor case 1 with an adhesive and fixed thereto.

When these members are assembled into a magnetic sensor, the detection units 2 are inserted into the respective unit receiving slots 1A, and the side spacers 7 are respectively attached to the right and left sides of the permanent magnet 4. Each of the adhesive surfaces 8B is bonded with the corresponding inclined surface 1B and side surface of the sensor case 1 with an adhesive, and thereafter a heated plastic material as a molding material 9 is poured into each unit receiving slot 1A from the undersurface side of the sensor case 1 so as to fix each detection unit 2 with the molding.

In the magnetic sensor having the above-described structure, when a bank note passes over the head cover 8, each of the magnetoresistance elements 5 produces an output voltage in accordance with the presence or absence of magnetic ink on the bank note, and the denomination is identified from the waveform of the output voltage.

Such a conventional magnetic sensor, however, has the following problems.

When a sensor case 1 is produced, a dimensional error is produced not only in the unit receiving slot 1A but also in the stem 3 of the detection unit 2 and the position at which the magnetoresistance element 5 is pasted. As a result, when the detection unit 2 is inserted into the unit receiving slot 1A of the sensor case 1, gaps $\Delta e_1$ and $\Delta e_2$ are produced on both sides of the unit receiving slot 1A, as shown in FIG. 22. If it is assumed that the width of the unit receiving slot 1A is a and the width of the stem 3 is b, the gap $\Delta e$ is represented by the following formula (1)

$$\Delta e = a - b \qquad (1)$$
$$= \Delta e_1 + \Delta e_2$$

Therefore, if it is assumed that when a bank note advances in the direction indicated by the arrow 10, as shown in FIG. 23, the detection reference surface of the sensor case 1 is A—A, the normal detection line along which the magnetoresistance element 5 carries out the detection operation is B—B, and the distance between the reference surface A and the detection line B is C, the distance C varies in the range of the gap $\Delta e$ with each magnetoresistance element 5. As a result, the position of the detection line B—B varies with each magnetoresistance element 5, thereby disabling the accurate detecting operation, so that the user is inconveniently required to repeat the insertion of the bank note many times.

In addition, in the conventional magnetic sensor, the head cover 8 is bonded with the sensor case 1 merely by fixing the right and left adhesive surfaces 8B of the head cover 8 to the side surfaces of the sensor case 1 with an adhesive. The head cover 8 is only made of one sheet of a nonmagnetic metal material to form the flat portion 8A and the adhesive surfaces 8B consisting of two bent portions.

Therefore, even in the state in which the head cover 8 is adhered and fixed to the sensor case 1, the unfolding force in the direction indicated by the arrow a in FIG. 22 acts on the adhesive surfaces 8B as a peel force, and the head cover 8 is easy to peel off the sensor case 1. Consequently, when the sensor case 1 is bolted to a machine frame or the like, or external impact force is applied to the sensor case 1 in order to incorporate the assembled magnetic sensor shown in FIG. 17 into a bank note identifying apparatus, stress acts on the head cover 8 and the adhesive joints are peeled off due to warping, distortion or the like, thereby disadvantageously removing the head cover 8.

SUMMARY OF THE INVENTION

Accordingly, it is an object of the present invention to eliminate the above-described problems in the prior art and to provide a magnetic sensor with the positional accuracy of the detection line enhanced by disposing each magnetoresistance element at a predetermined distance from the detection reference surface.

It is another object of the present invention to provide a magnetic sensor with the head cover fixed to the sensor case and retained thereby firmly.

To achieve this aim, in one aspect of the present invention, there is provided a magnetic sensor having a nonmagnetic sensor case provided with a plurality of unit receiving slots, detection units inserted into the unit receiving slots of the sensor case and having magnetoelectric transducer elements which are magnetically biased by a permanent magnet on the side of the surface over which an object being detected passes, and a non magnetic head cover provided on the sensor case in order to cover the the unit receiving slots of the sensor case on the side of the surface over which an object being detected passes, characterized in that the sensor case is provided with screw members for arranging the magnetoelectric transducer elements of the detection units in alignment on the detection line by pressing a positioning plate constituted by one side surface of each of the detection units against the inside wall of the corresponding unit receiving slot.

By adjusting the positioning plates of the detection units so as to be pressed against the side of the detection reference surface by using the screw members in this way, it is possible to arrange the magnetoelectric transducer elements in alignment on the detection line and, hence, to output the detection signal of the object being detected at a constant output without producing variation with each magnetoelectric transducer element, thereby greatly enhancing the detection accuracy.

In another aspect of the present invention, there is provided a magnetic sensor having a nonmagnetic sensor case provided with a plurality of unit receiving slots, detection units inserted into the unit receiving slots of the sensor case and having magnetoelectric transducer elements which are magnetically biased by a permanent magnet on the side of the surface over which an object being detected passes, and a non magnetic head cover provided on the sensor case in order to cover the the unit receiving slots of the sensor case on the side of the surface over which an object being detected passes, characterized in that the sensor case is provided with screw members for arranging the magnetoelectric transducer elements of the detection units in alignment on the detection line, and claw portion engaging grooves on the right and left side surfaces or the front and rear surfaces of the sensor case, and in that the head cover is provided with claw portions which are engaged with the respective claw portion engaging grooves, each of the claw portion being bent at a predetermined angle so as to have resilience.

This structure enables the magnetoelectric transducer elements to be arranged in alignment on the detection line and the head cover to be fixed to the sensor case by engaging the claw portions with the claw engaging grooves provided on the side surfaces of the sensor case. Since the claw portion is provided with resilience by being bent at a predetermined angle, it is possible to fix the head cover to the sensor case and retain it thereby firmly and to enhance the flatness of the head cover.

In still another aspect of the present invention, there is provided a magnetic sensor having a nonmagnetic sensor case provided with a plurality of unit receiving slots, detection units inserted into the unit receiving slots of the sensor case and having magnetoelectric transducer elements which are magnetically biased by a permanent magnet on the side of the surface over which an object being detected passes, and a non magnetic head cover provided on the sensor case in order to cover the the unit receiving slots of the sensor case on the side of the surface over which an object being detected passes, characterized in that the sensor case is provided with screw members for arranging the magnetoelectric transducer elements of the detection units in alignment on the detection line, and at least one pair of cover receiving grooves with the unit receiving slots therebetween on the side of the surface over which the object being detected passes, and in that the head cover is provided with at least one pair of leg portions which are inserted into the respective cover receiving grooves.

This structure enables the magnetoelectric transducer elements to be arranged in alignment on the detection line and the head cover to be fixed to the sensor case by inserting the leg portions of the head cover into the cover receiving portions. As a result, even if the unfolding force acts on the leg portions, the unfolding force is regulated by the cover receiving grooves and the fixation of the cover is secured.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1 and 2 show a first embodiment of a magnetic sensor according to the present invention, wherein FIG. 1 is a cross sectional view of the magnetic sensor; and FIG. 2 is a horizontal sectional view of the magnetic sensor shown in FIG. 1, taken along the line II—II;

FIGS. 5 to 7 show a fourth embodiment of a magnetic sensor according to the present invention, wherein FIG. 5 is a perspective view of the external appearance of the magnetic sensor;

FIG. 6 is a cross sectional view of the magnetic sensor shown in FIG. 5, taken along the line VI—VI; and . FIG. 7 is an exploded cross sectional view of the sensor case and the head cover;

FIGS. 9 and 10 show a sixth embodiment of a magnetic sensor according to the present invention, wherein FIG. 9 is a perspective view of the external appearance of the magnetic sensor; and FIG. 10 is a sectional view of the magnetic sensor shown in FIG. 9, taken along the line X—X;

FIGS. 11 to 13 show a seventh embodiment of a magnetic sensor according to the present invention, wherein FIG. 11 is a perspective view of the external appearance of the magnetic sensor;

FIG. 12 is a sectional view of the magnetic sensor shown in FIG. 11, taken along the line XII—XII; and FIG. 13 is an exploded cross sectional view of the sensor case and the head cover;

FIGS. 14 and 15 show an eighth embodiment of a magnetic sensor according to the present invention, wherein FIG. 14 is a cross sectional view of the magnetic sensor; and FIG. 15 is an exploded cross sectional view of the sensor case and the head cover;

FIGS. 17 to 23 show the prior art, wherein

FIG. 17 is a perspective view of the external appearance of a magnetic sensor in the prior art;

FIG. 18 is a plan view of of the magnetic sensor shown in FIG. 17 in the state of the cover being removed;

FIG. 19 is a perspective view of the external appearance of the detection unit;

FIG. 20 is a cross sectional view of the magnetic sensor shown in FIG. 17, taken along the line XX—XX;

FIG. 21 is a vertical sectional view of the magnetic sensor shown in FIG. 17, taken along the line XXI—XXI;

FIG. 22 is a cross sectional view similar to FIG. 20, showing the gaps produced between the sensor case and the detection unit; and FIG. 23 is a plan view similar to FIG. 18, showing the state in which the arrangement of the magnetoresistance elements is not in agreement with the detection line.

DESCRIPTION OF THE PREFERRED EMBODIMENTS

Figure 1:
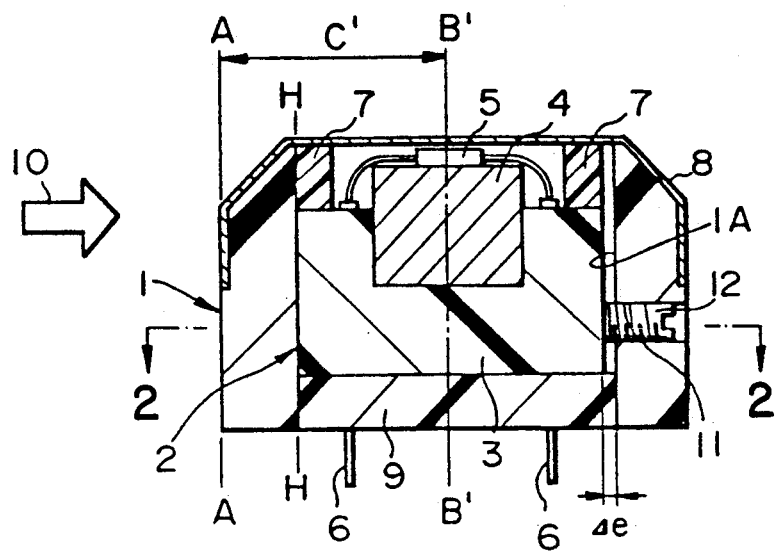

Embodiments of the present invention will be explained in detail hereinunder with reference to the accompanying drawings. The same reference numerals are provided for the same elements as those in the prior art and explanation thereof will be omitted.

Figure 2:
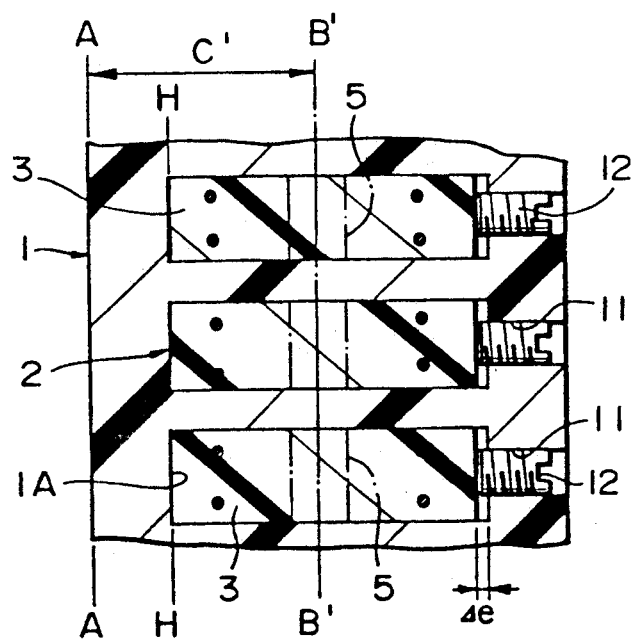

A first embodiment of the present invention is shown in FIGS. 1 and 2.

In FIGS. 1 and 2, the reference numeral 11 represents a threaded through hole formed in a side surface of the sensor case 1 in correspondence with each detection unit 2. In this embodiment, each threaded hole 11 is provided in the side surface of the sensor case 1 which is opposite to the side surface from which a bank note enters so as to be opposed to the stem 3.

The reference numeral 12 denotes an adjust screw which is freely screwed into and out of each threaded hole 11. When the adjust screw 12 is screwed into the threaded hole 11, the adjust screw 12 presses one side of the stem 3 against the inside wall H—H of the unit receiving slot IA on the side of the detection reference surface A—A.

The operation as a magnetic sensor of this embodiment having the above-described structure is not particularly different from the operation of a conventional magnetic sensor.

In this embodiment, however, the sensor case 1 is provided with threaded holes 11 and the adjust screws 12 for pressing the stems 3 of the detection units 2 against the inside walls of the unit receiving slots 1A. Therefore, even if the gap Δe in the widthwise direction exists between the detection unit 2 and the unit receiving slot 1A, the gap Δe is constantly formed on the side of the adjust screw 12, as shown in FIG. 2. As a result, the distance C' between the detection reference surface A—A and a detection line B'—B' is held constant, thereby enabling the magnetoresistance elements 5 to be arranged in alignment on the detection line B'—B'.

Consequently, when a bank note advances in the direction indicated by the arrow 10, the predetermined positions of the letters, marks, etc. of the bank note are simultaneously identified on the detection line B'—B', and each magnetoresistance element 5 outputs a highly accurate detection signal.

In addition, since it is possible to pour the molding material 9 for fixing the detection units 2 with the moldings after the detection units 2 are fixed by the adjust screws 12, the fixing operation is finished in a stable state free from undesirable movement of the detection units while the molding material 9 is being poured. Thus, it is possible to reduce the fluctuation of the output characteristics during use.

Since the gap Δe is derived from a dimensional error in the sensor case 1 and the stem 3 and a dimensional error in the position at which the magnetoresistance element 5 is pasted, if these errors are in the range of the tolerance, it is possible to substantially situate each magnetoresistance element 5 on the detection line B'—B'. Thus, this embodiment can sufficiently cope with the requirement for the high dimensional accuracy of the detection line.

Figure 3:
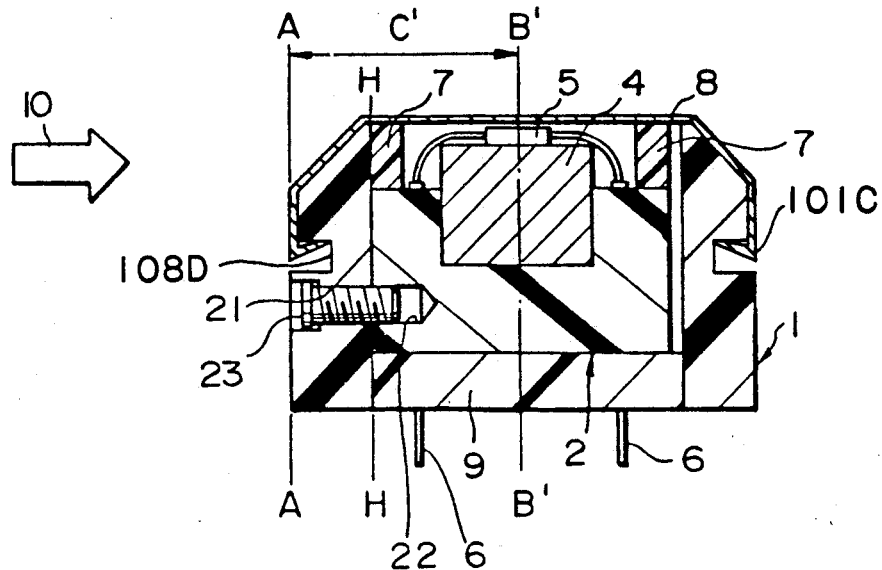
FIG. 3 is a cross sectional view of a second embodiment of a magnetic sensor according to the present invention.

FIG. 3 shows a second embodiment of the present invention. In FIG. 3, the reference numeral 21 represents a threaded hole formed in a side surface of the sensor case 1 in correspondence with each detection unit 2. In this embodiment, each threaded hole 11 is provided in the side surface of the sensor case 1 in the direction 10 from which a bank note enters. The reference numeral 22 denotes a threaded hole with a bottom provided in the side surface of the stem 3 at the position corresponding to each threaded hole 21. The threaded holes 21 and 22 are so formed as to receive a screw having the same configuration. The reference numeral 23 represents an adjust screw which is freely screwed into and out of each of the threaded holes 21 and 22. When the adjust screw 23 is screwed into the threaded holes 22 and 23, the adjust screw 23 presses the stem 3 against the inside wall H—H of the unit receiving slot 1A.

In this embodiment having the above-described structure, when the adjust screw 23 is screwed into the threaded holes 22 and 23, the stem 4 of the detection unit is pulled so as to be brought into close contact with the inside wall H—H of the unit receiving slot 1A, thereby enabling the magnetoresistance elements 5 to be arranged in alignment on the detection line B'—B'.

In addition, it should be apparent that the screw member for arranging the magnetic member in alignment which comprises the holes 21 and 22 and the screw 23 could be utilized in the other embodiments of this invention.

Figure 4:
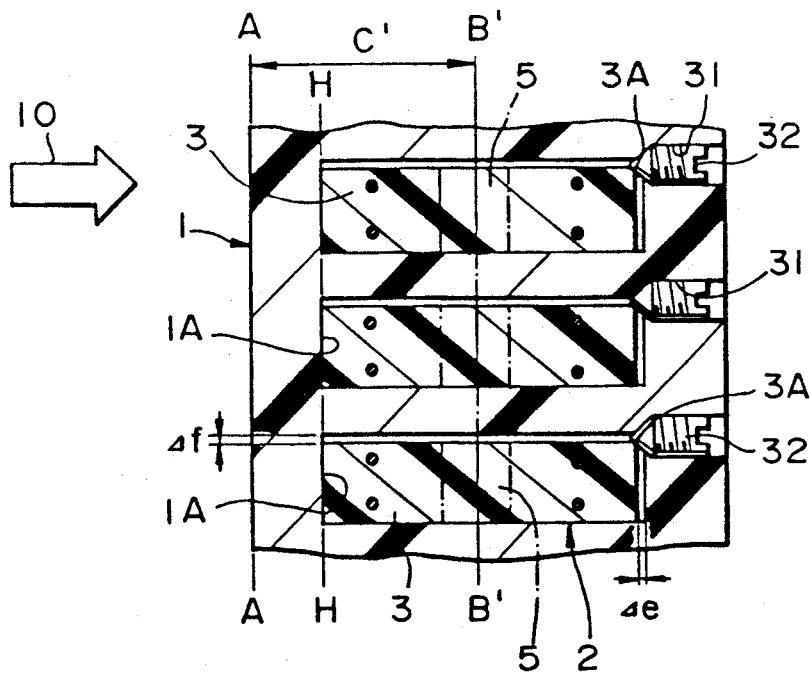
FIG. 4 is a cross sectional view of a third embodiment of a magnetic sensor according to the present invention.

FIG. 4 shows a third embodiment of the present invention.

In FIG. 4, the reference numeral 31 represents a threaded hole formed in the side surface of the sensor case 1 in correspondence with each detection unit 2. In this embodiment, the threaded hole 31 is provided in the side surface of the sensor case 1 which is opposite to the side surface from which a bank note enters so as to be opposed to the stem 3. The reference numeral 33 denotes an adjust screw which is freely screwed into and out of each of the threaded holes 31.

In this embodiment having the above-described structure, it is possible to arrange each magnetoresistance element 5 in alignment on the detection line B'—B' by screwing the adjust screw 32 in the threaded hole 31. Since the threaded hole 31 is provided so as to be opposed to the the corner portion 3A of one side of the stem 3, the screw head of the adjust screw 32 presses the corner portion 3A. Therefore, even if a gap $\Delta f$ in the thickness direction exists between the unit receiving slot 1A and the stem 3, the gap $\Delta f$ is constantly formed on the one side of the stem 3. As a result, it is possible to arrange the magnetoresistance elements 5 in alignment on the detection line B'—B' with a constant space therebetween in the longitudinal direction.

Although the detection reference surface is set at the front end surface of the sensor case 1 from which a bank note enters, it may be set at the rear end surface of the sensor case 1.

In addition, it should be apparent that the screw member for arranging the magnetic member in alignment which comprises the holes 31 and screw 32 could be utilized in the other embodiments of this invention.

Figure 5:
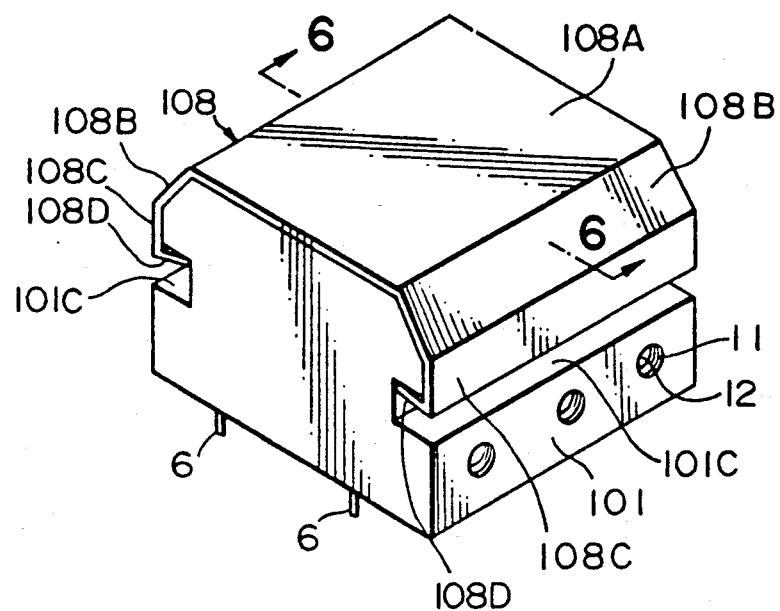
Figure 6:
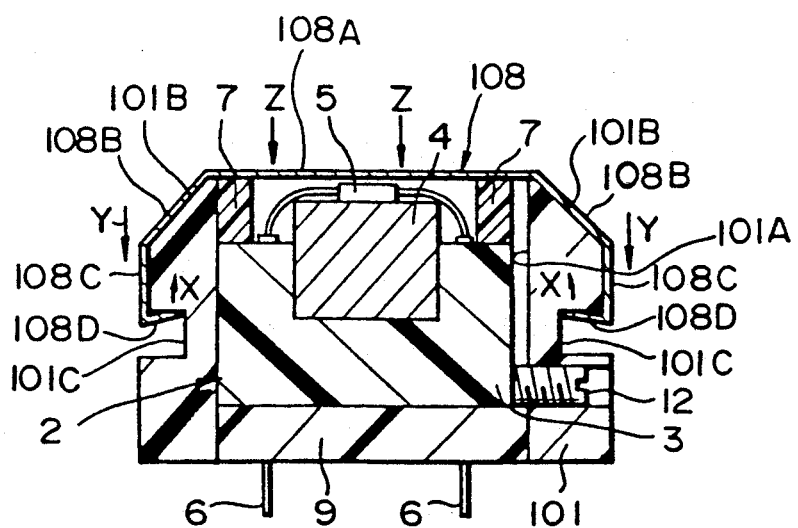
Figure 7:
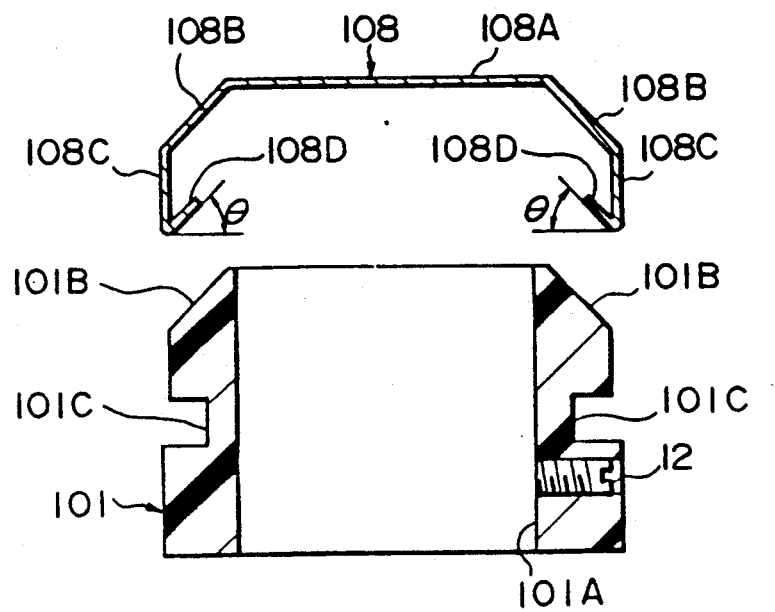

FIGS. 5 to 7 show a fourth embodiment of the present invention.

In these drawings, the reference numeral 101 represents a sensor case. The sensor case 101 is formed into substantially a cube and is provided with three vertical through holes as unit receiving slots 101A and inclined surfaces 101B on both sides in the widthwise direction of the upper surface over which an object being detected passes like the sensor case 1 in the prior art. The sensor case 101, however, is different from the sensor case 1 in the prior art in that claw portion engaging grooves 101B are provided on the right and left side surfaces, respectively. The claw portion engaging groove 101 is provided on the side surface over the entire width in the longitudinal direction of the sensor case 11 in such a manner as to have a U-shaped cross section and to be engaged with a claw portion 108 of a head cover which will be described later.

The head cover 108 is made of a nonmagnetic material and is provided in such a manner as to cover the magnetoresistance elements 5 and the side spacers 7 by covering the upper openings of the unit receiving slots 101A like the head cover 8 in the prior art. However, the head cover 101 in this embodiment is integrally composed of, not only a flat portion 108A for covering the unit receiving slots 101A so as to guide a bank note, but also inclined surfaces 108B which are formed by bending both sides of the flat portion 108A in conformity with the inclined surfaces 101B of the sensor case 101, leg portions 108C formed by further bending the lower ends of the inclined surfaces 108B in conformity with the side surfaces 101B of the sensor case 101, and claw portions 108D formed by bending the lower ends of the leg portions 108C in the configuration of V at a predetermined angle $\theta$ so as to be inserted into the respective claw portion engaging grooves 101C with resilience.

In order to assemble the sensor case 101 and the head cover 108 into a magnetic sensor, the detection units 2 are inserted into the corresponding unit receiving slots 101A of the sensor case 101, and the side spacers 7 are attached to the detection units 2. The claw portions 108D of the head cover 108 are then inserted into the claw portion engaging grooves 101C of the sensor case 101 in a slightly unfolded state in such a manner as to be slid in the longitudinal direction, and bonded thereto by filling the claw portion engaging grooves 101C with an adhesive, if necessary. Thereafter, the molding material 9 is poured from the undersurface side of the sensor case 101.

The operation as a magnetic sensor of this embodiment having the above-described structure is not particularly different from the operation of a conventional magnetic sensor.

In this embodiment, however, since the sensor case 101 is fixed to the head cover 108 by engaging the claw portions 108D with the claw portion engaging grooves 101C, a clamping force is produced on the claw portion 108D as indicated by the arrow X in FIG. 6, and a stretching force acts on the leg portions 108C as indicated by the arrow Y, so that a pressing force acts on the flat portion 108A as indicated by the arrow Z.

In this way, this embodiment enables the head cover 108 to be secured and retained more firmly without a fear of being removed than the prior art which uses an adhesive means.

In addition, since the pressing force in the direction indicated by the arrow Z acts on the flat portion 108A of the head cover 108, the flatness of the flat portion is greatly enhanced, thereby enabling a bank note to be smoothly guided and passed and preventing a detection error.

Figure 8:
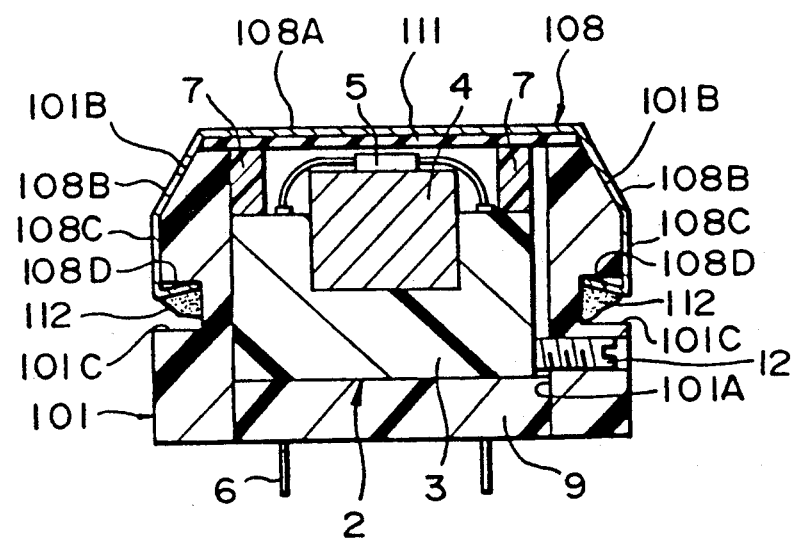
FIG. 8 is a cross sectional view of a fifth embodiment of a magnetic sensor according to the present invention.

FIG. 8 shows a fifth embodiment of the present invention. This embodiment is characterized in that the head cover is electrically insulated from the detection units, which are electric parts, in the fourth embodiment, thereby improving the dielectric strength and the insulation resistance.

In FIG. 8, the reference numeral 111 represents a thin insulating sheet provided on the inside wall of the flat portion 1A of the head cover 108 on the upper side of the sensor case 101. As the insulating sheet, an insulating tape, for example, is used. The reference numeral 112 denotes an insulating material with which the claw portion engaging groove 101C is filled.

In this embodiment having the above-described structure, the insulating sheet 111 is provided between the flat portion 108A of the head cover 108 and the detection units 2 so as to prevent the head cover 108 from directly facing the the electric parts such as the magnetoresistance elements 5, the terminal pins 6 and the lead wires. In this way, the atmospheric discharge between the electric parts and the head cover 108 is prevented, thereby enhancing the dielectric strength and the insulation resistance.

Furthermore, since the claw portion engaging groove 101 is filled with the insulating material 112 for fixing the claw portion 108D of the head cover 108, the ingress of moisture is prevented and the atmospheric discharge preventing effect is further enhanced.

Figure 9:
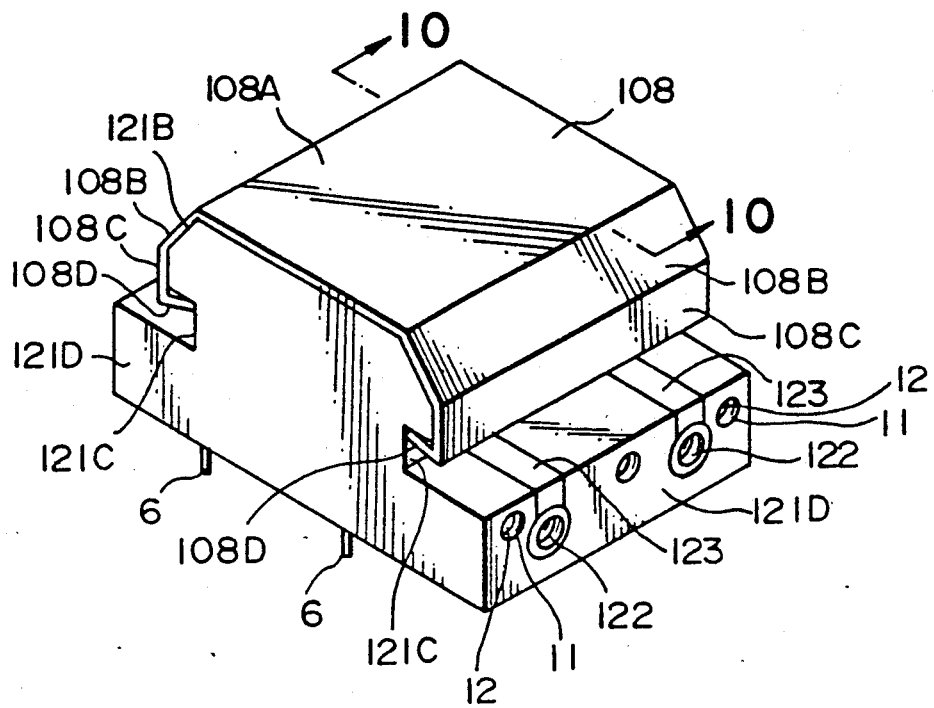
Figure 10:
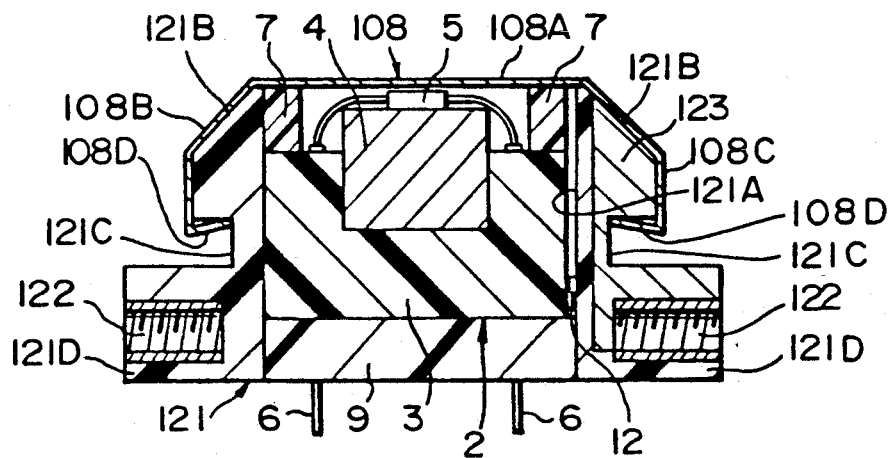

A sixth embodiment of the present invention is shown in FIGS. 9 and 10. Thus embodiment is characterized in that the electrostatic charges produced on the sensor case and the head cover are discharged to the outside.

In FIGS. 9 and 10, the reference numeral 121 represents a sensor case. The sensor case 121 is provided with vertical through holes as unit receiving slots 121A, inclined surfaces 121B on both sides in the widthwise direction of the upper surface thereof, claw portion engaging grooves 121C on the right and left side surfaces, and an internal thread mounting portion 121D which protrudes in the right and left widthwise directions below the claw portion engaging grooves 121C. Two metal internal threads 122 for mounting a magnetic sensor are cast as inserts together with the internal thread receiving portion 121D on both sides of the sensor case 121. On one side surface of the sensor case 121, conduction portions 123 made of a conductive resin material are integrally provided as members of the sensor case 121 at the positions corresponding to the respective internal threads 122. The conduction portion 123 constitutes a part of the inclined surface 121B and the claw portion engaging groove 121C and is electrically conductive with the internal thread 122.

When this embodiment having the above-described structure is attached to a bank note identifying apparatus, the sensor case 121 is fixed to the frame of the apparatus by screwing bolts into the internal threads 122. The head cover 108 is grounded through the conduction portions 123, the internal threads 122 and the frame of the apparatus.

Consequently, if the sensor case 121, the head cover 108 and the like are electrostatically charged, the static electricity is discharged through the conduction portions 123 consisting of a conductive resin material and the internal threads 122. In this way, it is possible to prevent noise from mixing with the output of the magnetoresistance element, 5 due to the electrostatic charges on the head cover 108, thereby preventing a detection error.

Additionally, in place of the conduction portion 123 of a conductive resin material, a copper foil may be adhered to or a copper material or the like may be printed on the side surface of the sensor case 121 in this embodiment.

Although the claw portion engaging grooves are provided both sides in the widthwise direction of the sensor case in this embodiment, they may be provided on the front and the rear surfaces in the thicknesswise direction.

Figure 11:
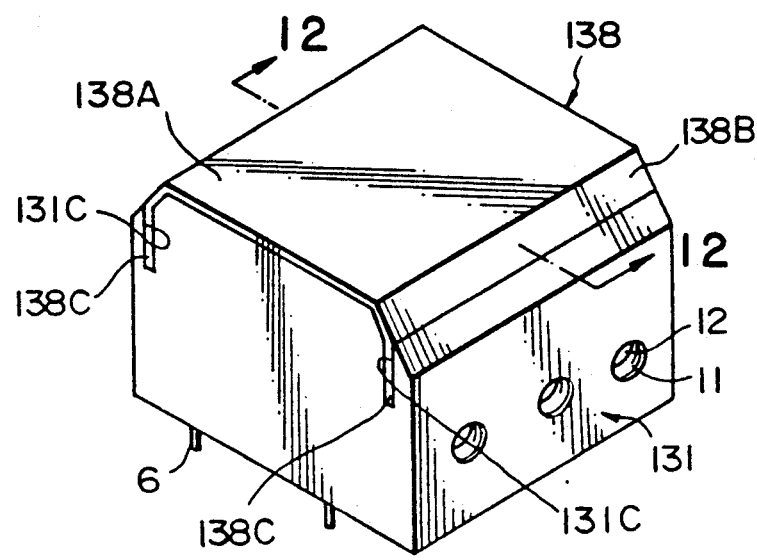
Figure 12:
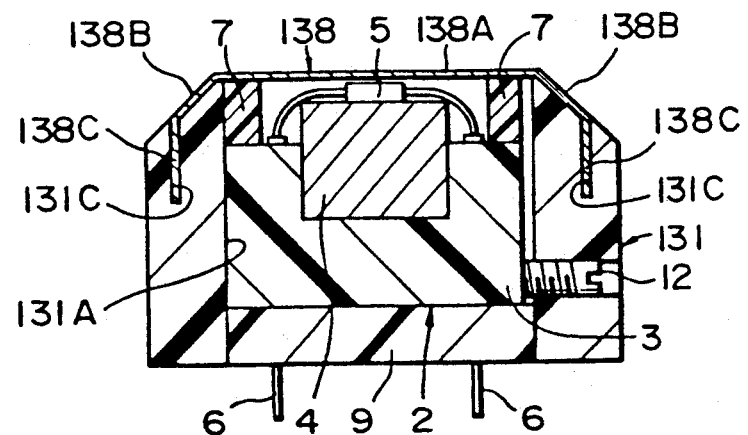
Figure 13:
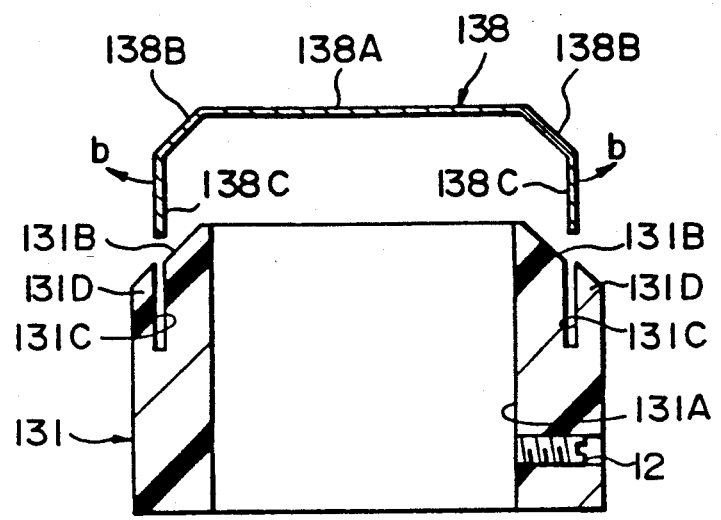

FIG. 11 to 13 show a seventh embodiment of the present invention.

In these drawings, the reference numeral 131 represents a sensor case 131 which is formed into substantially a cubic and is composed of three vertical through holes as unit receiving slots 131A and inclined surfaces 131B on both sides in the widthwise direction of the upper surface on the side of the surface over which an object being detected passes like a conventional sensor case. The sensor case 131 is different from the conventional one in that cover receiving grooves 131C are provided on the inclined surfaces 131B. The cover receiving groove 131C is provided in the form of a slit groove over the entire width in the longitudinal direction of the sensor case 131 so as to receive leg portions 138C of a head cover 138.

The head cover 138 made of a nonmagnetic material is provided in such a manner as to cover the magnetoresistance elements 5 and the side spacers 7 by covering the upper openings of the unit receiving slots 131A like the head cover 8 in the prior art. The head cover 138 in this embodiment is different from the conventional one 8 in that it is integrally composed of, not only a flat portion 138A for covering the unit receiving slots 131A, but also inclined portions 138B formed by bending the right and left sides of the flat portion 138A halfway along the inclined surfaces 131B of the sensor case 131, leg portions 138C formed by further bending the lower ends of the inclined portions 138B perpendicularly to the flat portion 138A so as to be engaged with the cover receiving grooves 131C.

In order to assemble the sensor case 131 and the head cover 138 into a magnetic sensor, the detection units 2 are inserted into the corresponding unit receiving slots 131A of the sensor case 131, and the side spacers 7 are attached to the detection units 2. The leg portions 138C of the head cover 138 are then inserted into the cover receiving grooves 131C of the sensor case 131 in such a manner as to be slid from the above or in the longitudinal direction and bonded thereto with an adhesive, if necessary. Thereafter, the molding material 9 is poured from the undersurface side of the sensor case 131.

The operation as a magnetic sensor of this embodiment having the above-described structure is not particularly different from the operation of a conventional magnetic sensor.

In this embodiment, however, since the sensor case 131 is fixed to the head cover 138 by engaging the leg portions 138C with the cover receiving grooves 131C, the leg portions 138C are safely guided to the cover receiving grooves 131C and fixed more firmly without a fear of being removed than the prior art which uses an adhesive means.

Since a nonmagnetic metal material is used for the head cover 138, the unfolding force in the direction indicated by the arrow b in FIG. 13 works on the leg portions 138C. In this embodiment, however, by virtue of the cover receiving grooves 131C provided on the sensor case 131C, the outside portions 131D of the cover receiving grooves 131C absorb the unfolding force, thereby firmly retaining the head cover 138.

Figure 14:
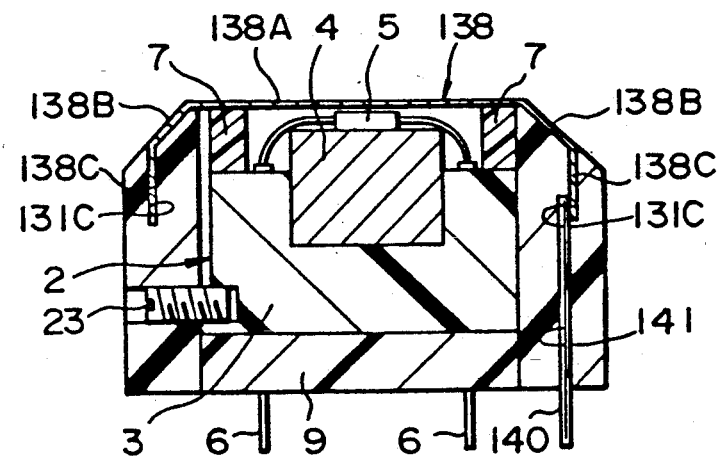
Figure 15:
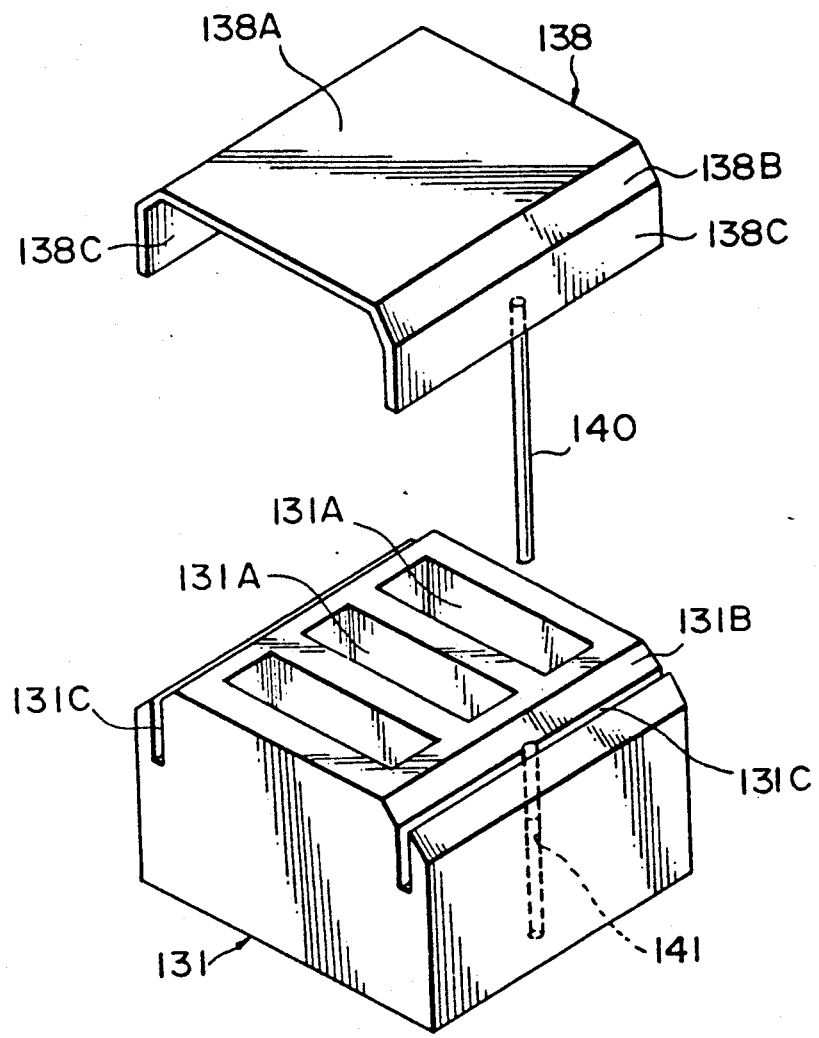

An eighth embodiment of the present invention is shown in FIGS. 14 and 15. This embodiment is characterized in that the static electricity produced on the sensor case and the head cover in the seventh embodiment is discharged to the outside.

In FIGS. 14 and 15, the reference numeral 141 represents a slit vertically provided in the right cover receiving groove 131C in the sensor case 131. The reference numeral 140 denotes a grounding terminal pin secured to the leg portion 138C of the head cover 138. The grounding terminal pin 140 is inserted into the slit 141 such that the end portion thereof projects outside in an assembled state. (See FIG. 14).

In this way, according to this embodiment, since the grounding terminal pin 140 provided on the head cover 138 is inserted into the slit 141 so as to connect to the ground, electrostatic charges produced on the sensor case 131 and the head cover 138 which may mix with the output of the magnetoresistance element 5 and result in detection error are safely removed.

In this embodiment, in place of the grounding terminal pin 140, a lead wire may be used, or the grounding terminal pin 140 may be integrally provided with the head cover 138.

Figure 16:
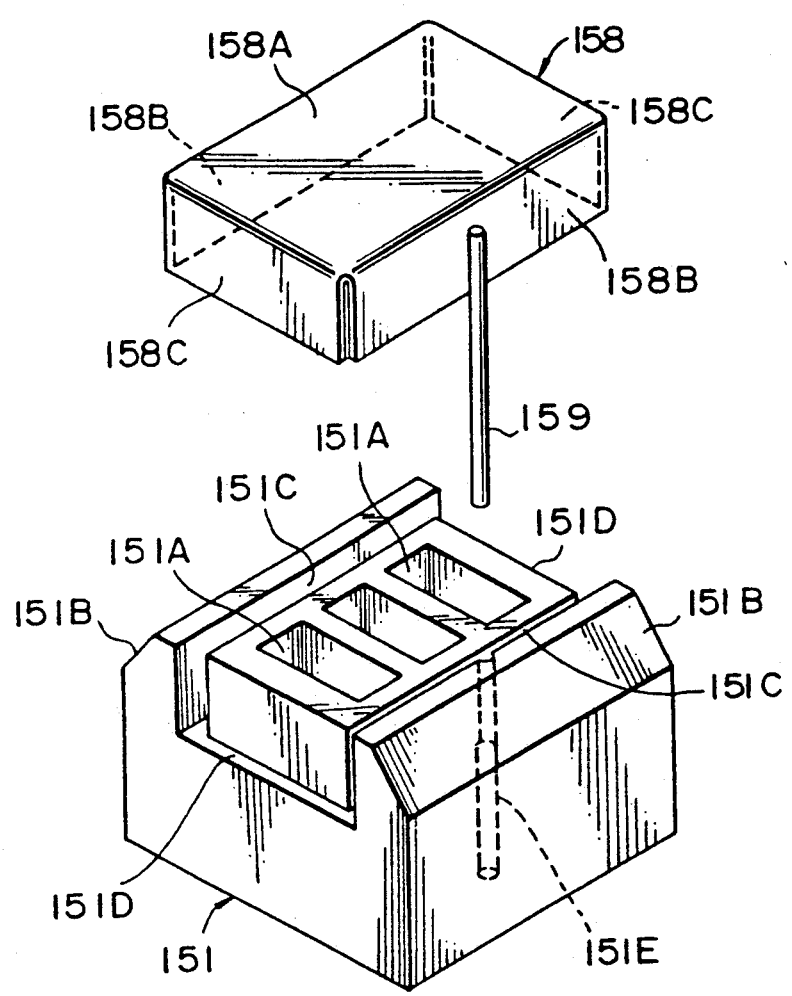
FIG. 16. is an exploded cross sectional view of the sensor case and the head cover of a ninth embodiment of a magnetic sensor according to the present invention.
Figure 17:
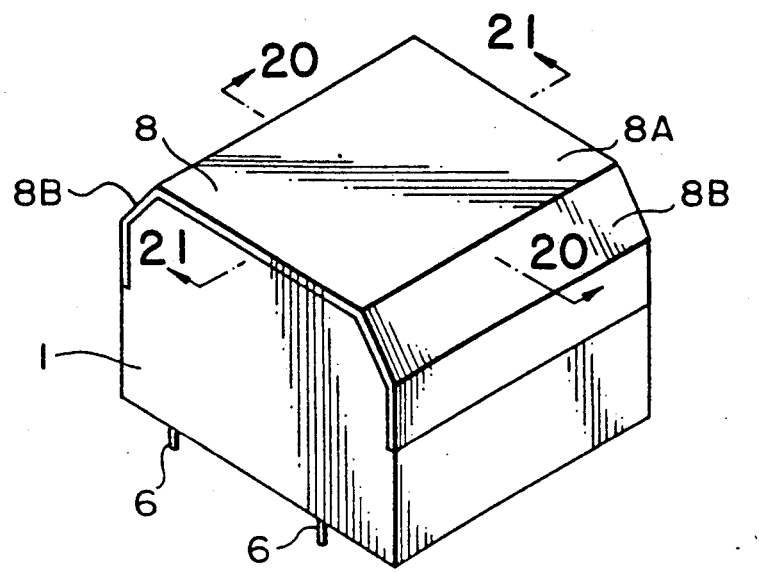
Figure 18:
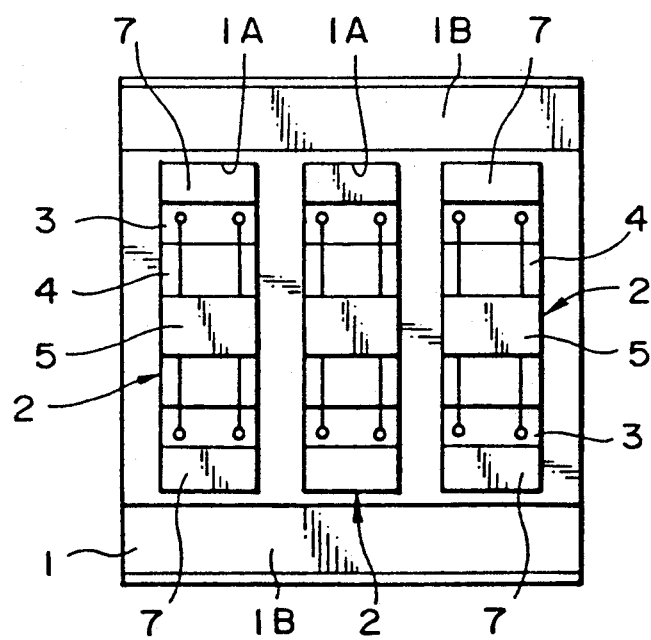
Figure 19:
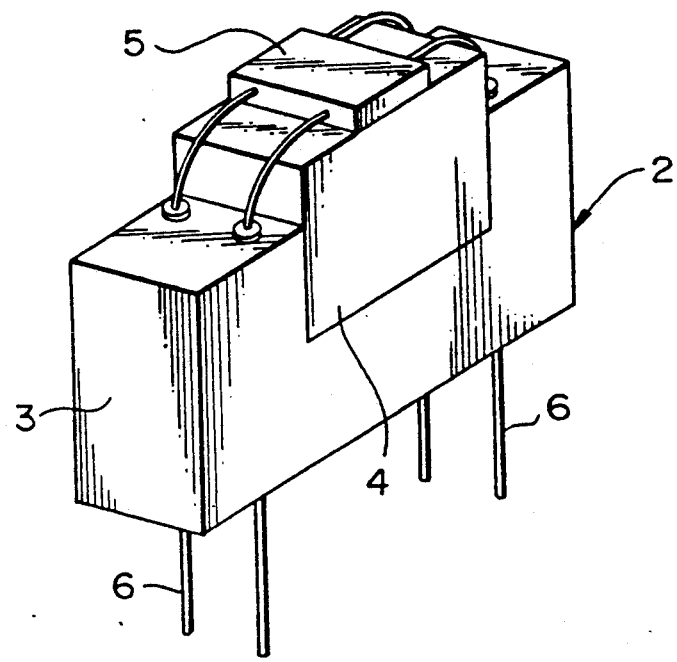
Figure 20:
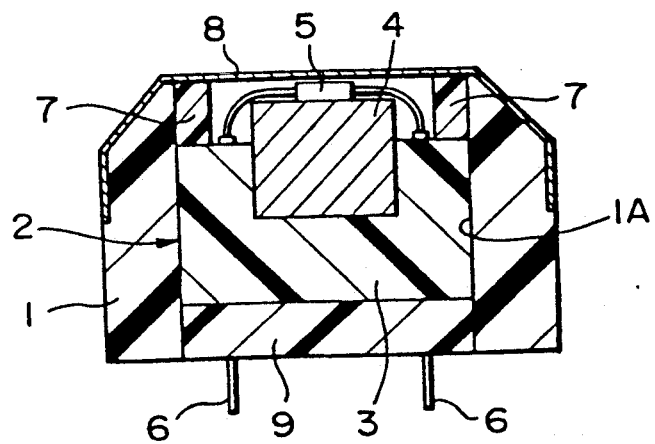
Figure 21:
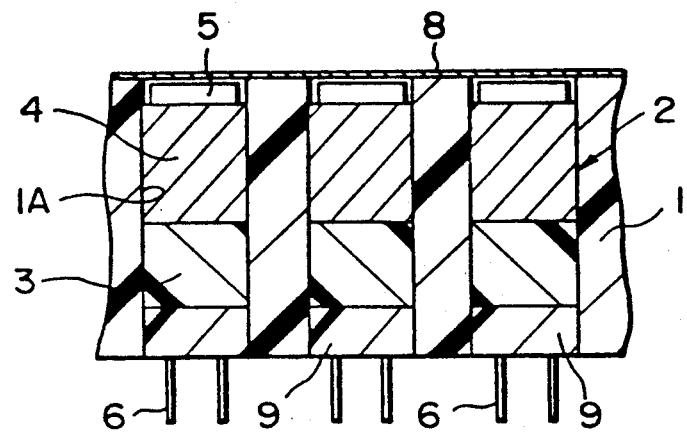
Figure 22:
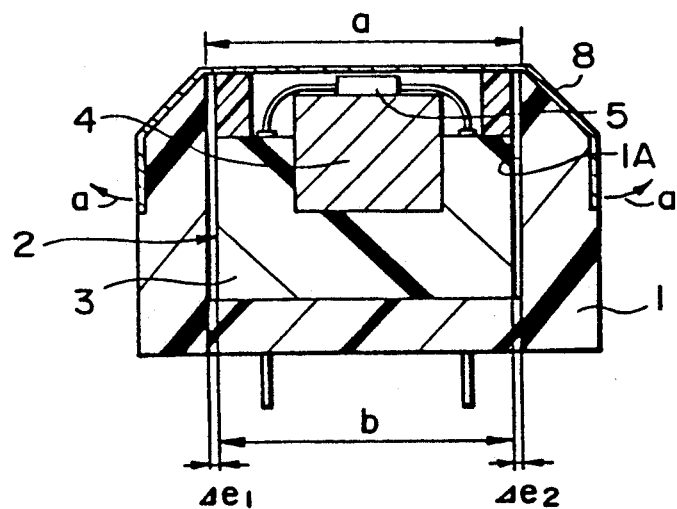
Figure 23:
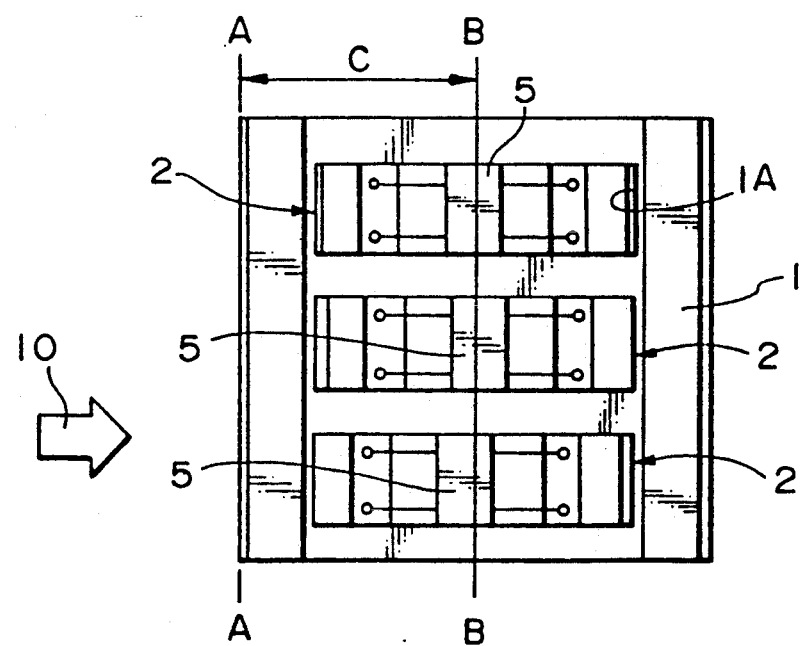

FIG. 16 shows a ninth embodiment of the present invention. This embodiment is characterized in that the head cover is formed into a box body with a cover and in that it has a structure for removing static electricity.

In FIG. 16, the reference numeral 151 represents a sensor case which is composed of three unit receiving slots 151A, inclined surfaces 151B on both sides in the widthwise direction of the unit receiving slots 151A, right and left cover receiving grooves 151C provided on the upper surface side of the sensor case 151 between the unit receiving slots 151A and the inclined surfaces 151B, recessed portions 151D provided on the front and rear end surfaces in the longitudinal direction, and a slit 151E provided in the cover receiving groove 151C on one side.

The reference numeral 158 denotes a head cover. The head cover 158 is composed of a flat portion 158A for covering the unit receiving slots 151A, first leg portions 158B formed by bending the right and left sides of the flat portion 151A at right angles so as to be engaged with the cover receiving grooves 151C, and second leg portions 158C formed by bending the front and rear sides of the flat portion 158A at right angles so as to be engaged with the recessed portions 151D. A grounding terminal pin 159 is secured to the first leg portion on one side so as to be engaged with the slit 151E.

According to this embodiment, since the sensor case 151 is provided with the cover receiving grooves 151C and the recessed portions 151D, and the head cover 158 is provided with the right and left leg portions 158B and the front and rear leg portions 158C, the head cover 158 is fixed to and retained by the sensor case 151 very stably. In addition, since the grounding terminal pin 159 is provided, removal of static electricity is ensured.

In this embodiment, it is also possible to replace the recessed portions 151D of the sensor case 151 by the same cover receiving grooves as the cover receiving grooves 151C, in other words, to provide a cover receiving groove around the entire periphery of the sensor case 151.

Three detection units are provided in the sensor case in each embodiment, but the number of the sensor cases may be on or more than three. Although the magnetoresistance element is pasted directly to the upper surface of the permanent magnet in the detection unit, it may be attached to the permanent magnet through a pellet or the like.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A magnetic sensor comprising:
   a nonmagnetic sensor case;
   at least one unit receiving slot provided in said sensor case;
   a plurality of nonmagnetic stems respectively inserted into said unit receiving slots;
   a plurality of permanent magnets supported by and fixed to said stems, an upper and under side magnetized as a south pole and a north pole respectively;
   a plurality of magnetoresistance elements magnetically biased by said magnets and located in the vicinity of an upper portion of said unit receiving slots;
   a nonmagnetic head cover provided on said sensor case so as to cover said unit receiving slot on the side of the surface of said sensor case over which said object being detected passes;
   at least one screw member for arranging said magnetoresistance elements of said detection unit in alignment on a detection line by pressing a positioning plate constituted by one side surface of said stems against the inside wall of said unit receiving slot;
   a plurality of claw portion engaging grooves provided either on the rights and left side surfaces or on the front and rear surfaces of said sensor case; and
   claw portions provided on said head cover at a predetermined folding angle so as to be engaged with said claw portion engaging grooves with resilience.

2. A magnetic sensor according to claim 1, wherein said screw member includes:
   a threaded hole provided in a side surface of said sensor case so as to be opposed to said stem of said detection unit; and
   an adjust screw provided so as to be freely screwed into and out of said threaded hole;
   whereby said adjust screw is screwed into said threaded hole so as to press said stem against one inside wall of said unit receiving slot of said sensor case, thereby arranging said magnetoresistance element in alignment on said detection line.

3. A magnetic sensor according to claim 1, wherein said screw member includes:
   a threaded hole provided in a side surface of said sensor case so as to be opposed to said stem of said detection unit;
   a threaded hole with a bottom in a side surface of said stem at the position corresponding to said threaded hole; and
   an adjust screw provided so as to be freely screwed into and out of said threaded hole;
   whereby said adjust screw is screwed into said threaded hole so as to pull said stem into close contact with one inside wall of said detection receiving slot of said sensor case, thereby arranging said magnetoresistance element in alignment on said detection line.

4. A magnetic sensor according to claim 1, wherein said screw member includes:
   a threaded hole provided in a side surface of said sensor case so as to be opposed to one corner portion of said stem of said detection unit;
   an adjust screw having a conic bottom portion and provided so as to be freely screwed into and out of said threaded hole;
   whereby said adjust screw is screwed into said threaded hole so as to press said corner portion of said stem against the inside wall of said detection receiving slot of said sensor case, thereby arranging said magnetoresistance element in alignment on said detection line.

5. A magnetic sensor according to claim 1, wherein an insulator is provided between said sensor case and each of said head cover and said claw portion receiving grooves is filled with an insulating material.

6. A magnetic sensor according to claim 1, wherein said sensor case is provided with an internal thread mounting portion protruding below and from said claw portion receiving grooves of said sensor case;
   a metal internal thread for mounting said magnetic sensor is cast as an insert together with said internal thread mounting portion; and
   an electrically conductive resin is integrally provided with said sensor case at the position corresponding to said internal thread.

7. A magnetic sensor comprising:

a nonmagnetic sensor case;

at least one unit receiving slot provided in said sensor case;

a plurality of nonmagnetic stems respectively inserted into said unit receiving slots;

a plurality of permanent magnets supported by and fixed to said stems, an upper and under side magnetized as a south pole and a north pole respectively;

a plurality of magnetoresistance elements magnetically biased by said magnets and located in the vicinity of an upper portion of said unit receiving slots;

a nonmagnetic head cover provided on said sensor case so as to cover said unit receiving slot on the side of the surface of said sensor case over which said object being detected passes;

at least one screw member for arranging said magnetoresistance elements of said detection unit in alignment on a detection line by pressing a positioning plate constituted by one side surface of said stems against the inside wall of said unit receiving slot;

at least one pair of said cover receiving grooves provided on said side of the surface over which said object being detected passes, said unit receiving slot being provided between said one pair of cover receiving grooves; and at least one pair of leg members provided on said head cover for fixing said cover in engagement with said cover receiving grooves.

8. A magnetic sensor according to claim 7, wherein: said screw member includes:

a threaded hole provided in a side surface of said sensor case so as to be opposed to said stem of said detection unit; and an adjust screw provided so as to be freely screwed into and out of said threaded hole;

whereby said adjust screw is screwed into said threaded hole so as to press said stem against one inside wall of said detection receiving slot of said sensor case, thereby arranging said magnetoresistance element in alignment on said detection line.

9. A magnetic sensor according to claim 7, wherein said screw member includes:

a threaded hole provided in a side surface of said sensor case so as to be opposed to said stem of said detection unit;

a threaded hole with a bottom in a side surface of said stem at the position corresponding to said threaded hole; and an adjust screw provided so as to be freely screwed into and out of said threaded hole;

whereby said adjust screw is screwed into said threaded hole so as to pull said stem into close contact with one inside wall of said detection receiving slot of said sensor case, thereby arranging said magnetoresistance element in alignment on said detection line.

10. A magnetic sensor according to claim 7, wherein said screw member includes:

a threaded hole provided in a side surface of said sensor case so as to be opposed to one corner portion of said stem of said detection unit;

an adjust screw having a conic bottom portion and provided so as to be freely screwed into and out of said threaded hole;

whereby said adjust screw is screwed into said threaded hole so as to press said corner portion of said stem against the inside wall of said detection receiving slot of said sensor case, thereby arranging said magnetoresistance element in alignment on said detection line.

11. A magnetic sensor according to claim 7, wherein a slit for receiving a pin is provided in one of said cover receiving grooves is provided; and a grounding terminal pin inserted into said slit is secured to one of said leg portions.

12. A magnetic sensor according to claim 7, wherein said cover receiving grooves are provided between inclined surfaces provided on both sides in the widthwise direction of said unit receiving slot and said unit receiving slot, and said head cover is formed into a box body with a cover.

13. A magnetic sensor comprising:

a nonmagnetic sensor case;

at least one unit receiving slot provided in said sensor case;

a plurality of nonmagnetic stems respectively inserted into said unit receiving slots;

a plurality of permanent magnets supported by and fixed to said stems, an upper and under side magnetized as a south pole and a north pole respectively;

a plurality of magnetoresistance elements magnetically biased by said magnets and located in the vicinity of an upper portion of said unit receiving slots;

a nonmagnetic head cover provided on said sensor case so as to cover said unit receiving slot on the side of the surface of said sensor case over which said object being detected passes;

nonmagnetic side spacers provided between said stems and said head cover on both sides of said magnetoresistance elements;

a molding material poured into said unit receiving slot from the undersurface of said sensor case for fixing said detection unit;

at least one screw member for arranging said magnetoresistance elements of said detection unit in alignment on a detection line by pressing a positioning plate constituted by one side surface of said stems against the inside wall of said unit receiving slot;

a plurality of claw portion receiving grooves provided either on the right and left side surfaces or on the front and rear surfaces of said sensor case; and claw portions provided on said head cover at a predetermined folding angle so as to be engaged with said claw portion receiving grooves with resilience.

* * * * *